SELECTIVE INHIBITING APPARATUS FOR A MAGNETIC CORE MATRIX

Filed Dec. 29, 1964

SELECTIVE INHIBITING APPARATUS FOR A MAGNETIC CORE MATRIX

Filed Dec. 29, 1964

3 Sheets-Sheet 2

SELECTIVE INHIBITING APPARATUS FOR A MAGNETIC CORE MATRIX

Filed Dec. 29, 1964

United States Patent Office 3,521,247
Patented July 21, 1970

3,521,247

SELECTIVE INHIBITING APPARATUS FOR A MAGNETIC CORE MATRIX

Gerhardus Bernardus Visschedijk, Hengelo, Netherlands, assignor to N.V. Hollandse Signaalapparaten, Hengelo, Overijsel, Netherlands Filed Dec. 29, 1964, Ser. No. 421,953
Claims priority, application Netherlands, Dec. 30, 1963, 302,787
Int. Cl. G11c 5/04, 11/02, 17/00
U.S. Cl. 340—174 7 Claims

ABSTRACT OF THE DISCLOSURE

A magnetic memory assembly including a core matrix in a resilient magnetically permeable layer where a magnetically permeable plate magnetically polarized in selected areas is urged against the cores to inhibit the cores adjacent the polarized areas of the plate from providing an output on an associated "read" line when the core is switched from a first to a second magnetic state.

Figure 1:
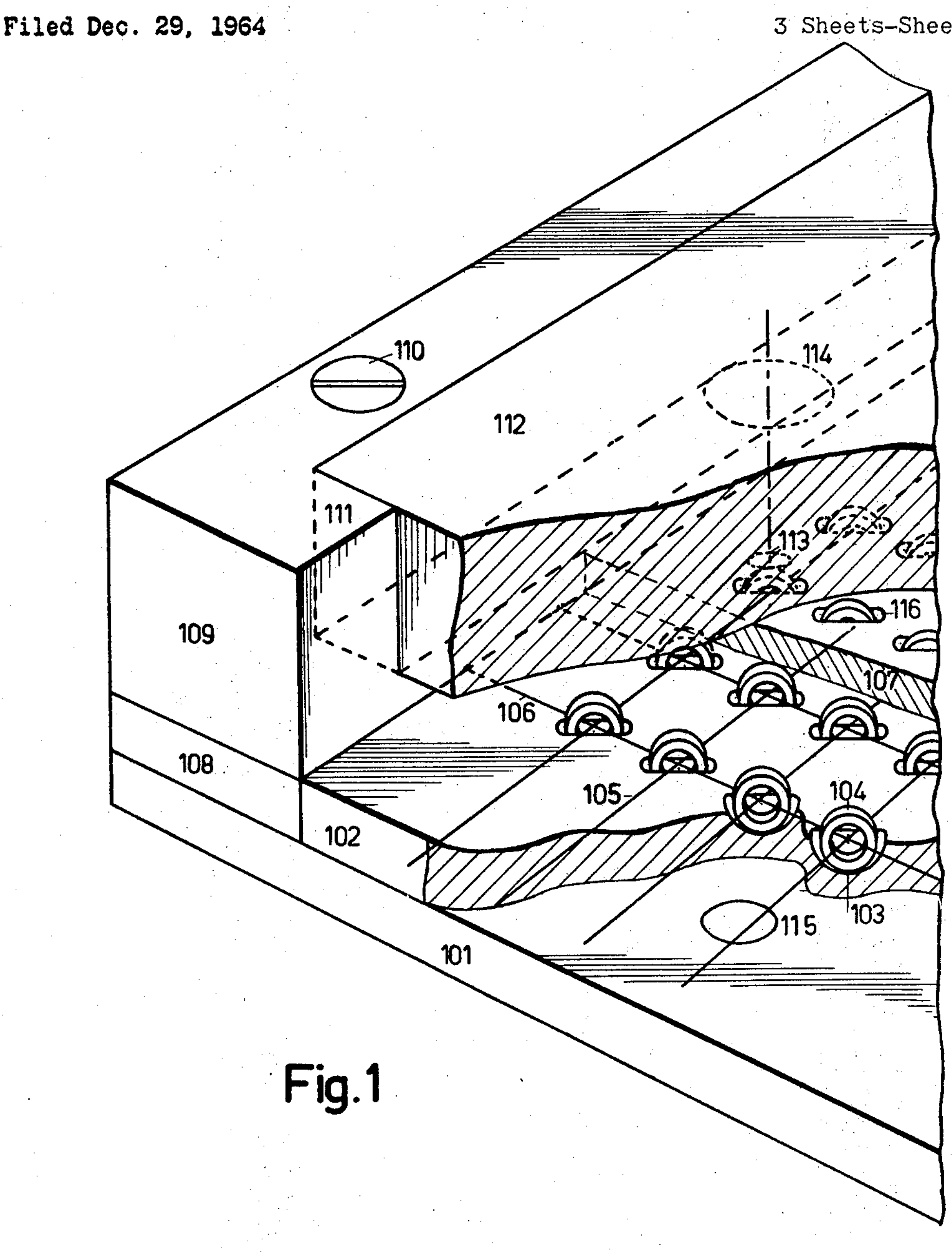

This invention relates to magnetic storage devices and more particularly but not necessarily exclusively to magnetic storage devices arranged in the form of a matrix. In a device of this type permanent information is stored in cores of magnetizable material by maintaining a strong additional flux through these cores thereby preventing the generation of significant read out voltages from these cores where read out currents are sent through the wires of the matrix windings.

In Belgian patent specification No. 627,326 there is described a matrix in which a small permanent magnet is located in close proximity with a core which is to be made ineffective as storage means. This magnet induces a sufficiently strong magnetic field in the core to prevent a current flowing through a winding of the matrix from significantly changing the magnetic flux in that core. Consequently, when the information in the matrix is read out, the core having a permanent magnet associated therewith will generate a much weaker read out voltage pulse in the associated read out wire than would be the case if the core had not been thus inactivated. In this specification an inactivated core is defined as a core which will generate a smaller read out pulse when interrogated than would a normal core. The read out system associated with the read out wires of the matrix can therefore easily be adjusted to respond exclusively to the pulses having a magnitude in excess of a predetermined threshold value induced by active cores. The reluctance of the magnetic circuit through which the flux of the permanent magnets passes is kept low by providing a path of high magnetic permeability near such cores.

The above described method of storing permanent information which can be applied to various types of storage matrices has several drawbacks. A storage matrix of normal dimensions must contain a large number of permanent magnets for storing fixed information words. On the average one magnet is needed for each two cores. Consequently the cost of all the magnets needed in such a storage matrix is fairly high. Moreover, the size of the magnets is small, and in most forms of construction the total length of the air gaps in the magnetic circuits is fairly large so that the magnets cannot sustain high fluxes for extended periods of time. Finally, no simple form of construction of this kind is as yet known in which a complete program of words, or at least a substantial proportion of such a program, could be stored in the matrix in one operation or even a few operations by making use of one or a few devices semi-permanently set to the required program in the matrix. In the matrix described above each bit of every word must be individually set by the provision or omission of a magnet. Errors are easy to make because each small magnet must be located at a particular point. For example a magnet may be placed into a specific opening within a rather small region containing many such openings.

The invention seeks to overcome these drawbacks by providing a magnetic storage device having a plurality of magnetic cores, a plurality of electrical conductors for setting, by means of current passed therethrough, one or more of said cores to a predetermined magnetic state and resetting the set cores to generate a voltage pulse from each of one of the reset cores of a magnitude exceeding a predetermined threshold value, and at least one plate comprising permanent magnet material and arranged in close proximity to said cores. The plate is magnetized so as to provide a plurality of magnetic poles, each of which lie adjacent different predetermined ones of said cores to induce a magnetic flux therein and thereby prevent those cores generating a voltage pulse having a magnitude in excess of said threshold value on the resetting of said set cores.

In those matrices referred to in the opening paragraphs of this specification, many hundreds of magnets would be required for setting up a program of fixed words. In the device according to the present invention the matrix needs merely one plate or a very few plates of permanent magnet material.

Such a plate will be hereinafter referred to as a "magnet plate."

Moreover, the magnetic reluctance of the path of the magnetic flux passing through the cores required to store fixed words can be much improved by providing much shorter air gaps than those found in the earlier construction. The flux density in the cores can thereby be higher and the risk of demagnetization substantially lessened, particularly by providing the storage matrix with a high permeability flux conducting system, such as a soft iron plate in close proximity to the cores of the matrix. Moreover, each magnet plate may extend across a number of lines of cores, each line storing a word, so that the magnet plate may contain at least a substantial proportion of a program of fixed words.

Practical forms of matrices forming a preferred embodiment of the present invention contain only one plate overlying the whole of the matrix. The plate contains a complete program of fixed wards. By the provision of such a plate the complete program or at least a major part of a complete program may be set up in a matrix. Later it will be described how such a plate of a suitable permanent magnet material can be magnetized. For performing this operation appliances can be used which readily permit the plate to be magnetized at the correct points. After having been in use in the matrix for some time for the storage of a particular program of words, the plate can be removed from the matrix in the magnetized state and kept. If a special previously used program is to be set up anew, then the prepared and previously used plate can be again fitted to the matrix. This operation is quite simple and can be satisfactorily performed without trouble. It will be readily understood that the described plates must be made of permanent magnet materials which can be magnetized at selected points, and in which the magnetic force will not spread out into other regions of the plate. A magnetic circuit is provided for the flux that passes through any inactivated core, the exact path being dependent upon the nature of the storage matrix and upon the way in which the plate is magnetized.

In a first embodiment of a magnetic storage device according to the invention arranged in the form of a matrix, each of the magnet plates is magnetized across the surfaces of the plate that extend parallel to a plane including the cores of the matrix. Magnetic poles are thereby induced which face the cores that are to be inactivated while corresponding poles of opposite polarity are included on the other side of the plate.

If the matrix is provided with two cores for each bit to be stored, then each line of cores will have the same number of inactivated cores and the plate will have the same number of poles facing each line. In such a matrix suitable return paths for the magnetic flux can be provided if the poles facing a line of cores all have the same polarity and the poles facing at least one neighboring line all have the opposite polarity.

In such a case the path taken by the flux intended to flow through a particular core passes through the magnetized plate and the pole facing the core. It then passes through this core and other adjacent cores. Assuming that a magnetically permeable system such as a soft iron plate, is also provided, the flux will flow through this system. The flux returns to the magnet plate through the adjacent cores and through the magnet plate to the pole facing the first core. During this latter part of the magnetic circuit part of the flux may travel through air on that side of the magnet plate inducing a field which faces away from the cores, whereas the remainder will flow through the plate itself. The above described arrangement is feasible only in the case of an even number of matrix lines since otherwise the number of poles of one polarity would not be equal to the number of poles of the other. In the event of the number of lines being odd, the magnet plate or one of its component plates is provided with an additional row of poles which do not face cores, so that the number of poles of one polarity is nevertheless equal to the number of poles of the other polarity. In an alternative arrangement according to the invention in which the plate is likewise magnetized across its surfaces, the poles located in a path containing all the poles on the surface of the magnet plate facing the cores and preferably extending up and down successive lines or columns, have consecutively opposite polarities. In such an arrangement the number of poles of one polarity cannot differ from the number of poles of the other polarity by more than one so that generally an appropriate return path for the magnetic flux will be available. According to the invention an additional pole which does not face a core might nevertheless be provided as a precaution if the number of poles happens to be odd. The latter arrangement in which consecutive poles are always of opposite polarity is also applicable to storage matrices, containing only one core per bit. In order to reduce to a minimum the reluctance of the path for the flux in the case of a plate magnetized across its surface, there may be provided in some embodiments of the invention on the side facing away from the cores of the magnet plate or plates a high permeability member that is capable of providing a good return path for the fluxes issuing from the magnet plate or plates. Should such a member be provided all the poles facing cores may have the same polarity, provided that a high permeability member is also provided on the other side of the matrix and low reluctance paths are provided between the two high permeability members. Preferably these paths are located outside the region containing the matrix cores. Preferably the surface area of the poles facing the cores should be small to ensure that most of the field emanating from the pole will actually enter the associated core without fringing. On the side of the magnet plate facing away from the cores the poles may have a much larger surface area to ensure that the field intensity in the region in which field lines tend to pass through air or through a specially provided high permeability member will be weak and a fairly large part of the field is induced to remain within the magnet plate because the large surface areas of the poles actually overlap.

In yet another embodiment of the magnetic storage device according to the invention each magnet plate is magnetized between two closely adjacent poles formed on the same side of the plate each opposite a core that is to be inactivated. In such a plate a permanent magnet is thus formed between each such pair of poles. In this arrangement the flux may flow from one pole to another particular pole, but preferably it may be arranged to flow from each pole to two other poles near this first pole. The latter method is to be preferred because it provides a path of greater cross section for the flux entering a pole. It is therefore capable of creating a more powerful field within the cores. In the last mentioned method of magnetization the plate must be provided with an additional pole near the end of each row of cores outside the region containing the cores in order to make two poles available for the return path of the flux passing through the last core in such a row. If a magnet plate is magnetized in this particular way it is unnecessary to provide a high permeability member on the side of the magnet plate facing away from the cores because the flux between consecutive poles remains substantially within the plate and exhibits no tendency to leave the plate.

Preferably each plate has a particular shape, or it is provided with projections or recesses for registering in one position only with respect to the cores.

While in the above general description and the ensuing detailed description, reference is made to magnetic core matrices it will be appreciated that the invention includes devices other than matrices in which a pattern of fixed registrations is required to be set in predetermind magnetic cores.

Figure 2:
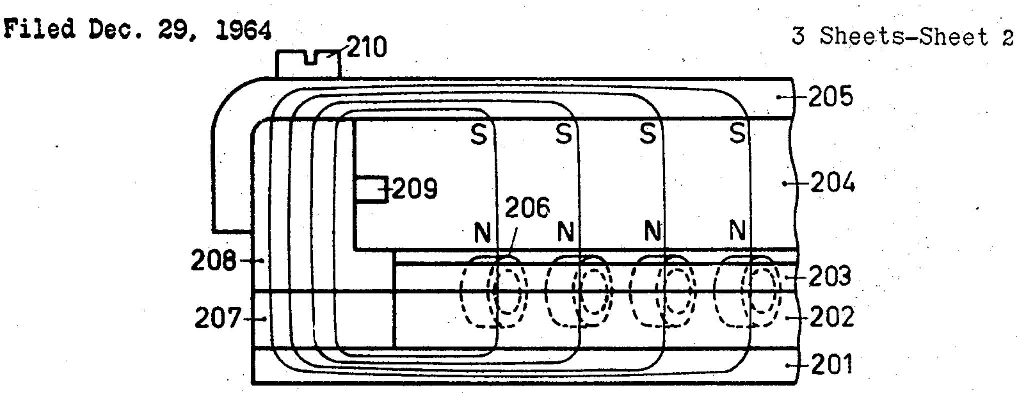
Figure 4:
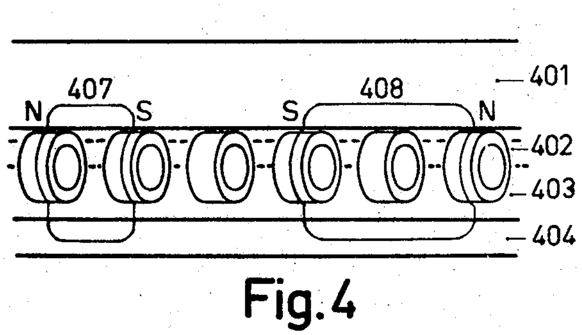
Figure 5:
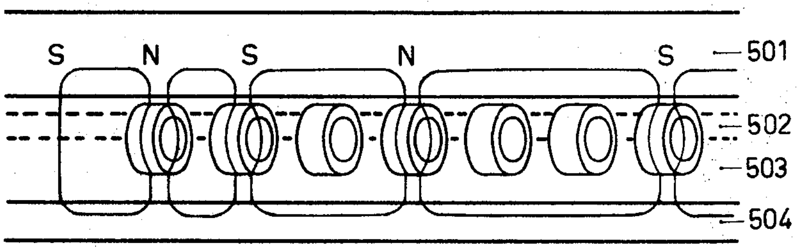
Figure 6:
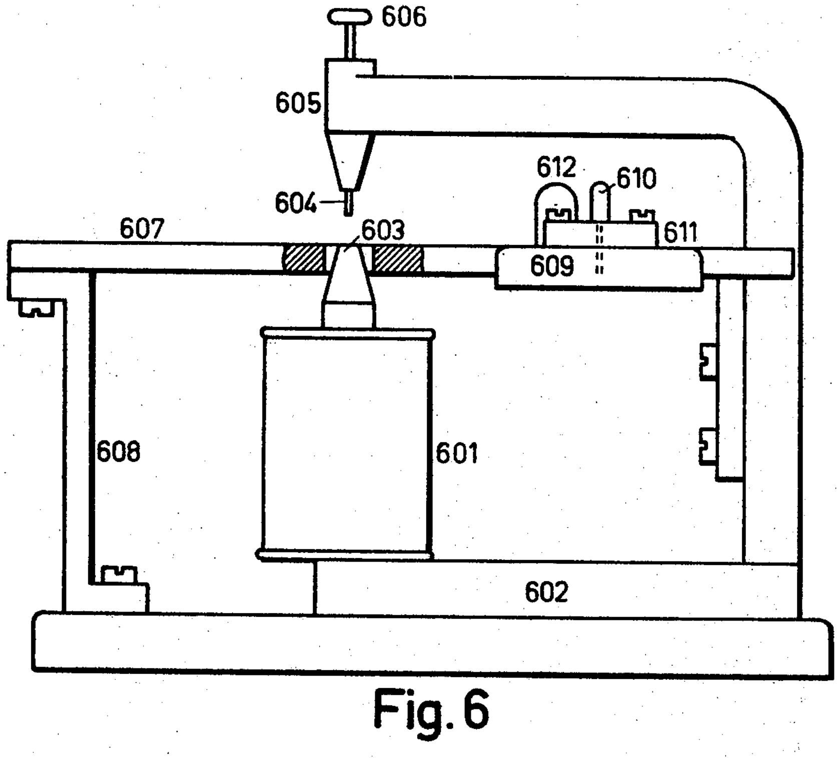
Figure 7:
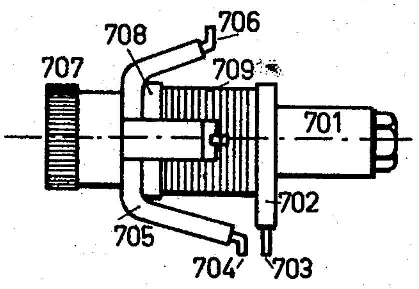
Figure 8:
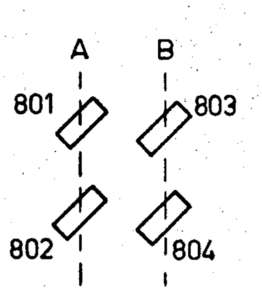

Preferred embodiments of the present invention will now be described in greater detailed with reference to the accompanying drawings, in which:

FIG. 1 is a perspective fragmentary view of a small section of a magnetic storage device according to the invention arranged in the form of a matrix, FIG. 2 is a front elevation of the matrix shown in FIG. 1, FIGS. 3, 4 and 5 show different arrangements of the magnetic circuits in magnetic storage devices according to the invention, FIGS. 6 and 7 are appliances for magnetizing a plate for the purpose of inactivating cores, and FIG. 8 illustrates specific ways of magnetizing 4 adjacent cores.

FIG. 1 is a perspective fragmentary view of part of a first embodiment of a magnetic storage device according to the invention arranged as a matrix. In this matrix 101 is a soft iron baseplate. The baseplate carries a layer 102 of resilient plastic containing powdered iron or a powered iron compound of high permeability which conducts magnetic flux far better than a material that is not ferromagnetic. Layer 102 is provided with numerous sockets 103 which do not extend through the entire thickness of the layer. Each of these sockets contains an annular core 104. The position of each core in layer 102 is thus fixed. Moreover, layer 102 is precisely located on baseplate 101 by projections on the underside of the layer engaging cylindrical openings 115 in baseplate 101. The position of the cores in relation to the baseplate is thus likewise precisely fixed. The centers of the sockets 103 in the plane of the surface of layer 102 are located at the intersections of two relatively perpendicular sets of parallel lines which divide the surface of layer 102 into a pattern of adjacent rectangles. The wires connecting the matrix cores run approximately along these lines. The selector wires run along one set of lines, whereas the reading out and writing wires (105) extend along the lines of the other set. In the direction of the set of wires marked 106 layer 102 is located between plastic ledges of which one marked 108 is shown in the drawing. The underside of each of these ledges rests on baseplate 101, whereas its upper surface is provided with grooves for the reception of the selector wires (106) where these leave the matrix. Each ledge carries a bar 109 made of plastic and secured together with ledge 108 to baseplate 101 by screws 110. The facing sides of the two bars 109 (only one is shown) are each formed with a rectangular recess 111. A magnet plate 112 which consists of a material of high remanence and high coercivity fits into the two recesses on opposite sides of the matrix. When the plate is held in these recesses 111 it just bears down on to the ring-shaped cores 104. This is assured because any ring which accidentally projects a little too far upwards can be pressed down into its containing socket 103, slightly compressing the plastic resilient material between the bottom of the ring and the surface of the baseplate 101. In the illustrated example the magnet plate is magnetized across its thickness. The plate has a magnetic pole facing each core which is to be inactivated. One of these poles is schematically shown at 113. On the upper surface of the plate is the other pole 114 of opposite polarity, which is associated with pole 113. Pole 114 has a much greater surface area than the pole 113. The field lines emanating from the smaller pole 113 nearly all enter and pass through the annular core below. They then enter the permeable material of the layer 102 and then pass into the soft iron baseplate 101. Hence the core below pole 113 is magnetized sufficiently to prevent currents flowing through the selector and writing wires of the core below pole 113 from significantly changing the magnetization of the core. Consequently a core located under such a pole will at best induce a voltage in the associated reading wire that is much weaker than that which would be generated by a core not situated opposite a pole in the plate 112. This permits the threshold of response of the reading system to be so adjusted that it is not affected by voltages induced in cores that have been inactivated as described above. The reading system will however continue to respond to voltages induced in cores that are still active.

In order to ensure that the cores in the sockets of the layer 102 will precisely face the poles in the magnet plate 112 a covering layer 107 is provided which has holes which exactly fit around the ring-shaped cores and which are positioned at points exactly corresponding to the positions of the sockets in the layer 102.

It will be readily understood that a good return path must be provided for the magnetic flux from poles 113 which inactivate cores underneath. This can be readily provided in a matrix containing two cores per bit. In such a storage matrix half the cores in each line of cores extending in the direction of the selector wires 106 and storing one word are inactivated. Each line therefore contains an equal number of active and inactivated cores so that the same overall flux is needed for inactivating all the cores to be inactivated in a line. Therefore, if the poles which inactivate the cores in a particular line have a polarity which is opposite to that of the poles which inactivate the cores in an adjacent line, then the flux flowing through the cores of the first mentioned line can return through the cores of the second line. Moreover, in every line the inactivated cores are arranged in a special way. The two cores which store a particular bit are usually not only side by side in the same line but the two columns of cores which contain these two cores in the matrix are also allocated to the corresponding bit. Therefore one of the two cores in each line is inactivated in these columns.

FIG. 8 illustrates the relative positions of the cores allocated to a particular bit in two consecutive lines. A and B are the two columns allocated to the bit. If this bit in memory is 1 then the core in column A is inactive. If it is 0 than the core in column B is inactive. The following configurations of inactivated cores are therefore possible: 801 and 802, 803 and 804, 801 and 804, 803 and 802.

Assuming that the cores are located at the corners of a square, then the length of the path the flux must take between inactivated poles in the two columns that are here considered, assuming that the magnetic circuit is completed in the above described manner through the cores of two adjacent lines, must be either equal to the spacing of the cores if the two inactivated cores are in the same column, or it must be $\sqrt{2}$ times the spacing if the inactivated cores are in different columns. In either case the path is short and the flux return path conditions are therefore favorable.

Figure 3:
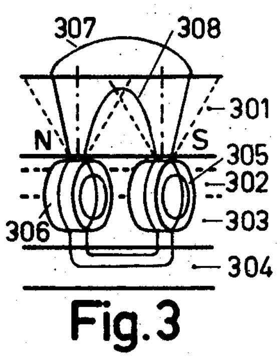

In the above described arrangement FIG. 3 illustrates the path of the flux when two cores in the same column have been inactivated. This drawing also shows that the poles which face the cores have a small face, whereas the poles on the other side of the magnet plate have a large face. The cross sections of the magnetized cone-shaped zones in the plates are indicated by dotted outlines. 301 indicates the magnet plate itself, 302 is the covering layer, 303 the resilient layer, 304 the baseplate and 306 is a core. Near this core the plate 301 has a north pole, whereas it has a south pole near the other core 305. Since the faces of the poles on the surface of the plate facing away from the cores have larger areas, the magnetized portions of the plate associated with neighboring cores overlap on this side of the plate and a portion of the field lines need not therefore leave the interior of the plate at all, as indicated at 308. Another portion of the field lines marked 307 emerges from the larger area north pole on the side of the plate facing away from the cores and passes a short distance through air before reentering the contiguous south pole on the same side of the plate. Since the surface area of the poles on this side of the plate is large, the field strength for leaving and entering the plate need not be high. If there are many lines with inactivated cores side by side, then none of the lines of force will usually be forced out of the surface of the plate facing away from the cores, provided the poles on this side of the plate have a sufficiently large surface area.

The lines of force which flow through a particular inactivated core in this arrangement for magnetizing the cores will therefore either return through other inactivated cores in the neighboring line on one side or through inactivated cores in the neighboring line on the other side or through cores in both neighboring lines. Even if the plate is not provided with a low reluctance member, as will be described later, the necessity of providing closed circuits for the flux does not require the poles for inactivating cores in consecutive lines to be of opposite polarity. However, if the low reluctance member above referred to is not provided, then there must be present, adjacent each line in which cores are inactivated by poles of a particular polarity, at least one other line in which poles are inactivated by poles of opposite polarity, in order that a return path shall be available. However, the configuration in which the poles which inactivate cores in consecutive lines have opposite polarities will generally provide better return paths for the magnetic fields. The above described arrangement is suitable only when the number of lines is even and when there are therefore as many lines in which cores are inactivated by north poles as there are lines in which cores are inactivated by south poles. If the number of lines is odd, then paths of sufficiently low reluctance will not be available for the magnetic fields inactivating cores in the lines on the edge of the matrix. However, this difficulty can be overcome by providing a magnet plate containing a line of poles on one edge of the matrix which is not associated with a line of cores. This line may then be spaced roughly the same distance away from the last line in the matrix as the other lines are spaced inter se, the separation of the poles in this additional row corresponding to the separation of the poles in a row facing cores. For example, one pole may be provided for each other column. The polarity of the poles in this additional row is the reverse of that of the poles in the neighboring operative row. The number of rows on the plate is therefore even and in a storage matrix with two cores per bit there will then be as many north poles as south poles, so that a suitable return path is available for the flux through every core.

In an alternative distribution of the poles which will be now described an additional row of poles is never needed. In this distribution the poles facing cores contained in paths which extend back and forth across the matrix and preferably back and forth along the lines or along the columns of the matrix have alternate opposite polarities. If in this arrangement a pole facing a core nearest the end of a particular line is of given polarity, say a north pole then the next core that is to be inactivated in the same line is faced by a pole of opposite polarity, i.e. by a south pole. The pole facing the following core that is to be inactivated in the same line will then again be a pole of the polarity of the first. The last pole inactivating the core nearest the other end of the line will then have a particular polarity, and it is now proposed that the pole facing the first inactivated core at the same end in the neighboring line will again be of opposite polarity. The following poles for inactivating further cores in this second line again alternate in polarity. In such an arrangement of the poles each core that is inactivated by a north pole will not be far away from another core that is inactivated by a south pole and the inactivating flux can therefore flow through both these cores. If the number of cores is even, each core will always be close to another core through which its inactivating flux can pass to complete the magnetic circuit. However, if the number of cores is odd, then theoretically one pole will be without a return path. However, in actual practice the flux is always so divided that the flux through all cores has suitable return paths. The magnetization of the cores therefore remains nearly the same as in a matrix with an even number of poles. If desired, an additional pole which does not face a core could be provided near the last pole of the last line to provide a return path for the flux through this last pole. However, in practice this is certainly unnecessary. Small differences in the magnetization of the numerous poles give rise to far larger balancing fluxes than the missing pole would actually provide. If the matrix has two cores per bit in adjacent columns, then the spacing of two poles of opposite sign in the same line never exceeds three times the core spacing. The flux then has no difficulty in finding paths on the side of the magnet plate facing away from the cores through which the magnetic reluctance is sufficiently low and the arrangements that will be hereunder described may in practice not often be needed. If the matrix has only one core bit then the distance between the two nearest poles may be quite long, and in such a case it will generally be necessary to provide special arrangements that will be hereunder described with reference to FIG. 2.

FIG. 3 shows that some of the field lines emerge from the surface of the magnet plate facing away from the cores. This will be more pronounced if the poles on this side of the plate are only slightly or not enlarged. In order to provide a good return path for the flux on this side of the plate, several embodiments of matrices according to the invention are provided with a highly permeable member on the side of the magnet plate facing away from the cores. In the simplest practical embodiment such a member is a soft iron plate bearing against the magnet plate and holding the same on the matrix as shown in FIG. 2. In this drawing 201 is the soft iron baseplate. 202 is the resilient layer and 203 the covering layer. The drawing further shows a number of cores of which one is marked 206. Part 204 is the magnet plate which has a pole facing each of the cores that is to be inactivated. A soft iron plate 205 bears on this magnet plate and is secured by screws 210 to the bars 208 on each side of the matrix. In the matrix illustrated in FIG. 2 each pole on the magnet plate has the same polarity. The soft iron plate 205 nevertheless provides paths for a closed magnetic circuit through each of the cores. In order to reduce the magnetic reluctance of each circuit the bar 208, which corresponds to the bar 109 in the matrix shown in FIG. 1, is made of soft iron. Since it is difficult to provide a soft iron bar with a recess corresponding to recess 111 in FIG. 1 for the reception of the magnet plate, the bar 208 in FIG. 2 has an L shaped cross section along its entire length and plate 204 is located between two pins 209 screwed into each of the bars 208 on either side of the matrix. Moreover, the ledge 207 which is interposed between bar 208 and baseplate 201 and provided with grooves for the passage therethrough of the wires of the matrix winding consists of a synthetic material containing powdered iron, so that it has a relatively low magnetic reluctance. In the drawing north poles in plate 204 face a number of cores. The south poles which correspond to these north poles and which are created when the plate is magnetized, are located on the reverse face of the magnet plate and they are contiguous with the soft iron plate 205. The flux through a core emerges from the north pole in the magnet plate 204 facing the core, passes through the core and the material containing iron powder and forming the resilient layer 202, then through the soft-iron baseplate 201, the material containing iron powder and forming ledge 207, the soft iron bar 208, the soft iron plate 205 and back to the south pole which in the reverse face of plate 204 corresponds to the north pole from which the flux issued.

The type of magnetization described by reference to FIGS. 3 and 8 can be employed only when the matrix has two cores per bit. If this is not the case the number of cores which must be inactivated in the several lines of the matrix will normally not be the same so that the arrangement described by reference to FIGS. 3 and 8 would not provide return paths for the flux.

The arrangement which contains poles of alternate polarity is applicable to a matrix in which there is only one core per bit, as in the arrangement described by reference to FIG. 2 in which the return paths are generally independent of the polarity of the poles which inactivate other cores. However, in the embodiment according to FIG. 2 it is by no means necessary that all the poles should have the same polarity. It would be quite feasible to distribute the poles in such a way that some were north poles and others south poles. This method has the advantage that a distribution can be devised in which only a small part of the flux must take the longer path through the bars 208, whereas the major part of the flux could find return paths through cores in the more immediate vicinity which happen to be faced by a pole of appropriate polarity. Although in a matrix with two cores per bit the provision of a soft iron plate for backing the magnet plate may in these circumstances be unnecessary. The presence of such a plate has advantages in a matrix with only one core per bit because in such a matrix poles of opposite sign may be fairly far apart.

The plate which supplies the magnetic fluxes for inactivating the cores may be magnetized in other ways, particularly when applied to a matrix with two cores per bit. FIG. 4 is an example of such an alternative arrangement. In FIG. 4 the magnet plate is marked 401, 402 in the covering layer, 403 the resilient layer and 404 the soft iron baseplate. If the magnet plate 401 is required to have for example poles at two points in a given line, then the plate is magnetized by an electromagnet between these two poles in a line more or less parallel to its surface. In a matrix with two cores per bit the poles thus induced may be separated by the spacing of 1, 2 or 3 cores. The drawing indicates magnetization of the magnet plate extending the length of one and two core spacings. The field lines emerge from the magnet plate at a north pole, pass through the core facing this north pole and then through the thin section of the resilient layer under the core, the soft iron baseplate, back through the thin section of the resilient layer through a different core under the corresponding south pole in the plate which they reenter. 407 indicates the path of the flux in the case of two adjacent inactivated cores, whereas 408 shows the flux in the case of two cores separated by an intervening active core.

FIG. 5 is an alternative embodiment of this type of magnetization which is, however, capable of inducing a stronger field in the cores. In this latter arrangement 501 is the magnet plate, 502 is the covering layer, 503 is the resilient layer and 504 the soft iron baseplate. If it is desired to provide a south pole at a given point in a magnet plate according to FIG. 5, then this plate is magnetized from this south pole to the next pole required in any direction, which must then be a north pole. The plate is also magnetized from the same south pole in the opposite direction to the next pole required which will then likewise be a north pole. In the same way a north pole is provided on each side with an associated south pole. The magnetic flux through a core that is to be inactivated therefore comes from two sides and the intensity of magnetization of the core can thus be greater. A minor problem is presented by poles which face the last core at the end of a line. The magnet plate need be provided with only one pole on one side of such an outside pole for inactivating the core. However, it is desirable that such an outside core should nevertheless be inactivated by a similarly high flux as that which flows through the other inactivated cores in the line. Sometimes it may be possible to provide a second return path for the flux through such an outer pole through a pole facing a core in an adjacent line, but this calls for special arrangements. It is therefore preferred in this method of magnetization to provide the magnet plate with an additional pole in the vicinity of an outer core that is to be inactivated, so that magnetic flux from the outer inactivated core can flow through this additional pole although it actually faces no core. Such a core will then carry the flux from a pole which also inactivates another core in the same line as well as the flux from the additional pole located outside the region of the actual core matrix.

Two methods of magnetizing magnet plates for matrices will now be briefly described. The first method is suitable for magnet plates which are to be magnetized transversely from surface to surface at right angles to the plane of the matrix. This method is performed with the aid of an appliance that is schematically illustrated in FIG. 6. This appliance comprises a soft iron yoke 602 provided with energizing winding 601 and a pole with a relatively large face 603 for inducing the relatively large area poles on the back of the magnet plate. The other end of the yoke carries a soft iron sleeve 605 in which is slidably mounted a vertical thin soft iron rod 604 with a setting knob 606. The diameter of this thin rod defines the diameter of the small pole intended to face a core in the magnet plate and is adapted to induce such a pole in the plate when lowered into contact therewith. The device is mounted on a table 607 of non-magnetizable material, such as duralumin. The table is flat and has a central opening into which pole 603 projects in such manner that its end face is flush with the table top. On the right hand side in the drawing the table is supported by the yoke, whereas its left hand end rests on a bracket 608. The plate that is to be magnetized is placed on the table and therefore touches pole 603, whereas rod 604 can be lowered into contact with the top of the plate. In order to permit the plate to be easily magnetized at precisely predetermined centres which will later face the cores in a matrix, the appliance is fitted with a guide rail 611 adapted to be slid traversely across the table 607. In order to ensure precise translatory motion of the guide rail each end of the rail has a slipper member 609 which embraces one edge of the table. The guide rail can be locked in required positions by means of round-headed locating pins of which one is shown at 610. Each pin passes through a hole in the guide rail 611 and can selectably engage one of a number of corresponding openings in the table. A row of holes for the reception of the pins is provided near the table edges on each side of the yoke 612. The spacing of the holes is arranged to correspond to the spacing of the lines in the matrix. The plate that is to be magnetized is placed firmly against the guide rail which is then successively moved and locked on the table in the different positions in which the plate is to be provided with poles spaced apart on lines corresponding to the line spacing in the matrix. Moreover, the position of the holes in the table in relation to the pole rod 604 is such that the poles will be induced at centers corresponding to lines of cores in the matrix when the magnet plate is fitted on to the matrix. In order to permit the plate to be magnetized at the appropriate centers, the guide rail is provided with divisions corresponding to the positions of the cores in a line. The edge of the guide rail may be provided with slits separated by a distance corresponding to the spacing of consecutive cores in a line. The slits are arranged to receive a small well fitting platelet 612 for transverse location of the plate of which one corner can be placed against said platelet. During magnetization of the plate the guide rail 611 is successively located in the different positions corresponding to consecutive lines in the martix and in each such position of the guide rail the locating platelet 612 is successively placed into slits in the rail, so that the plate kept in contact with the platelet will align with the pole rod 604 at a point which will later face a core that is to be inactivated. Each time the plate has been set up precisely, winding 601 is energized by sending a current through the same in the appropriate direction for the creation of a pole of the required polarity. This current may be derived from a standard source of D.C. or it may be provided by the discharge of a condenser. It will not always be possible to use magnet plates which overlie the entire matrix. In such a case 2, 3 or 4 smaller plates must be used an fitted on to the matrix side by side. If the dimensions of the plates are made to fine dimensional tolerances it should be possible to magnetize each component plate separately in an appliance such as that illustrated in FIG. 6. The precision of the plates will then ensure that the poles are formed at the correct locations. However, the extra trouble involved in working to such fine tolerances can be saved if the component plates are simply placed on to the table of the magnetizing appliance side by side in such manner that the edges running at right angles to the guide rail 611 align exactly. It is quite easy to construct a clamp which can be attached to the edges of the plates for holding them in correct alignment without obstructing the magnetizing operation. Alternatively, the plates could be temporarily or permanently bonded together with an adhesive before they are magnetized.

FIG. 7 illustrates an electromagnet which permits a plate to be magnetized in the manner indicated in FIGS. 4 and 5. The electromagnet has a winding 709 on a soft iron core provided with soft iron flanges. Flange 702 carries a soft iron pin 703 for inducing one of the two poles. At its other end the core carries a rotatable member 705 with three arms. Each arm of this member carries a small pin (704, 706). By rotation of the rotatable member any one of its pins can be moved into alignment with pin 703. To this end the rotatable member is fitted with an actuating knob 707 and a simple arresting device (such as a snap action ball and notch device) for locating the rotatable member in those positions in which one of its pins aligns with pin 703. According to the angular position of the rotatable member the relative spacing of the poles represented by the spacing of aligning pins corresponds to a single, double or triple core spacing in the matrix. By means of a bolt and nut the core is attached to an arm of which the front end is represented at 701, whereas the other end extends into the plane of the paper and is mounted at the right hand edge of a table constructed in the same way as table 607 in FIG. 6 for rotation about a horizontal shaft (not shown) extending along the table edge. The table is again fitted with a guide rail 611 as in FIG. 6 and when a plate is placed for magnetization against the guide rail and locating plate, well defined points of the plate will be situated directly beneath the poles of the magnet energized by winding 709, when this magnet is lowered on to the plate by hingeably swinging down arm 701 about the shaft at the right hand end of the table. The types of magnetization illustrated in FIGS. 4 and 5 can thus be induced.

If the matrix is provided with a soft iron plate fitted on to the back of the magnet plate on the side facing away from the cores, the soft iron plate will hold the magnet plate in position. If such a soft iron plate is absent it is desirable to locate the magnet plate in some other way. The matrix may be provided with a backing plate of non-magnetizable material that is affixed to the matrix. Alternatively, swivel fasteners could be fitted to the bars 109 (FIG. 1).

When the plate is magnetized to form associated poles spaced varying distances apart on the same side of the plate, then the number of ampere turns must naturally be chosen to conform with the distance between the poles, either by varying the current or the intensity of the current pulse or by changing the number of effective turns of the magnet windings.

It will be readily understood that even when the poles are disposed in ways that differ from the above described configurations, suitable paths for completing the magnetic circuits through each of the inactivated cores can be contrived.

What I claim is:

1. A magnetic storage device comprising a plurality of magnetic cores, means for setting each said core to a first magnetic state, means for switching said cores from said first magnetic state to a second magnetic state, read wire means adjacent each said core for sensing the change of state of a core from said first magnetic state to said second magnetic state, and a plate of permanent magnet material adjacent each of said cores, said plate having a plurality of pairs of magnetic poles forming part of the surface of said plate and extending transverse to the surface of said plate, the side of said plate facing said cores having a substantially equal number of north and south poles, and wherein a pole of one polarity has a pole of opposite polarity in proximity thereto.

2. A magnetic storage device as claimed in claim 1, in which the poles situated on a path containing all the poles on that side of the magnet plate which faces the cores, are successively of opposite polarity.

3. A magnetic storage device as claimed in claim 1, in which said plate is magnetized between closely spaced pairs of opposite poles located on the same side of the plate.

4. A magnetic storage device as claimed in claim 1 wherein said cores are arranged in the form of a matrix providing two cores for storing a bit, wherein the poles facing a first line of cores are all of one polarity, and wherein the polarity of the poles facing the cores in at least one of the adjacent lines is opposite the polarity of said first line of cores.

5. A magnetic storage device as claimed in claim 4, wherein said matrix has an odd number of lines, wherein said plate has an additional row of poles directly adjacent a row of poles facing cores on the edges of the matrix, said additional poles not facing a row of cores and having a polarity which is opposite to that of the poles in the adjacent row.

6. A magnetic storage device comprising a plurality of magnetic cores, means for setting each said core to a first magnetic state, means for switching said cores from said first magnetic state to a second magnetic state, read wire means adjacent each said core for sensing the change of state of a core from said first magnetic state to a second magnetic state, a plate of permanent magnetic material contacting each of said cores, said plate having a magnetic area adjacent at least one of said magnetic cores in the contacting area to inactivate said core adjacent said area, and a resilient magnetically permeable layer parallel to said plate and having sockets closed at one end for receiving said cores and for flexibly biasing each said core against said plate.

7. A magnetic storage device as claimed in claim 6, including a covering layer having apertures therein aligned with said sockets and overlying said resilient layer to maintain said cores substantially at right angles to that face of said plate in contact with said cores.

References Cited

UNITED STATES PATENTS

| | | | |
|---|---|---|---|
| 2,961,745 | 11/1960 | Smith | 29—604 |
| 3,403,389 | 9/1968 | Ellson et al. | 340—174 |
| 3,060,411 | 10/1962 | Smith | 340—174 |
| 3,140,403 | 7/1964 | Mörwald | 340—174 |
| 3,164,814 | 1/1965 | Hebert | 340—174 |
| 3,195,115 | 7/1965 | Bradley | 340—174 |
| 3,214,741 | 10/1965 | Tillman | 340—174 |
| 3,263,221 | 7/1966 | Van Der Hoek | 340—174 |
| 3,337,856 | 8/1967 | Bate et al. | 340—174 |

OTHER REFERENCES

E. G. Newman, "Adaptive Logical Device," IBM TDB, v. 4, n. 1, June 1961, pp. 58–59.

BERNARD KONICK, Primary Examiner

J. F. BREIMAYER, Assistant Examiner